Jan. 1, 1924
E. R. BRAINERD
DOUBLE DECK BUS
Filed Aug. 22, 1921
1,479,426
2 Sheets-Sheet 1
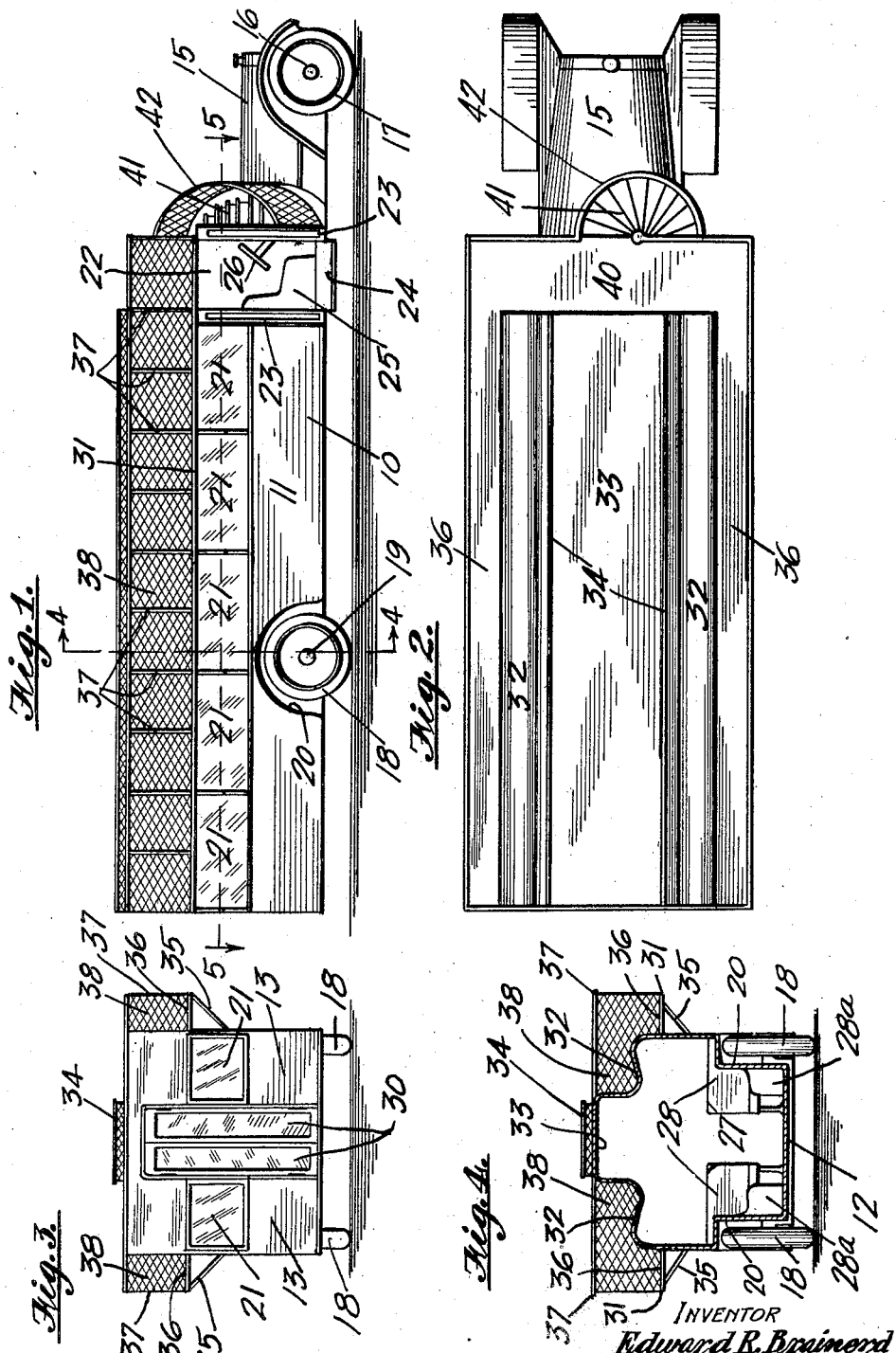
INVENTOR
Edward R. Brainerd
By Hazard & Miller ATT'YS.

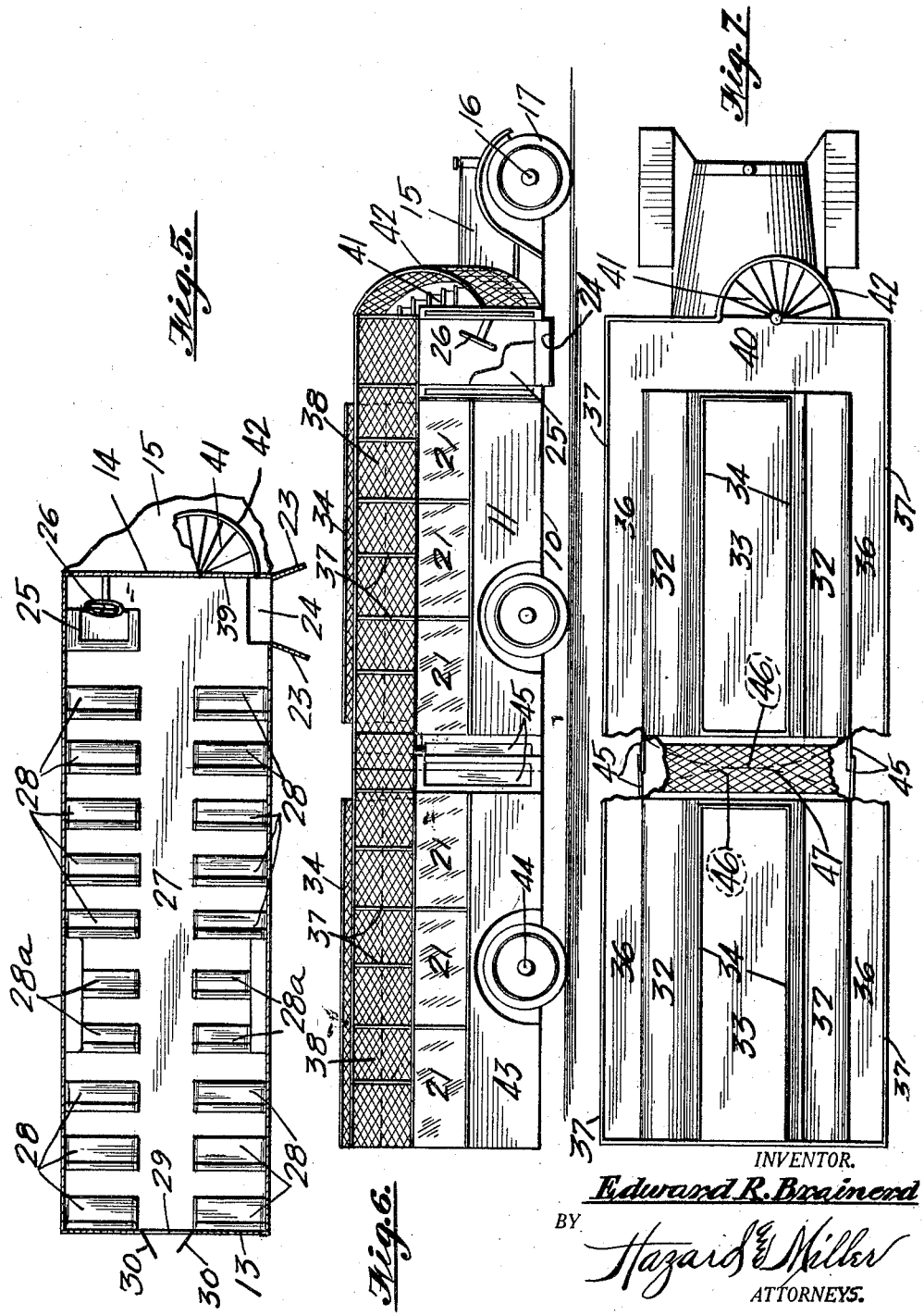

Patented Jan. 1, 1924.

1,479,426

UNITED STATES PATENT OFFICE.

EDWARD R. BRAINERD, OF LOS ANGELES, CALIFORNIA.

DOUBLE-DECK BUS.

Application filed August 22, 1921. Serial No. 494,093.

*To all whom it may concern:*

Be it known that I, EDWARD R. BRAINERD, a citizen of the United States, residing at Los Angeles, in the county of Los Angeles and State of California, have invented new and useful Improvements in Double-Deck Busses, of which the following is a specification.

My invention relates generally to vehicles for the transportation of passengers, and more particularly to a motor driven omnibus; the principal object of my invention being to provide a passenger carrying vehicle of the type referred to that is provided with an upper deck or section having seats that are adapted to be occupied by passengers, and further to construct the body of the vehicle so that it has a relatively low center of gravity, and with the bottom of the body of the vehicle occupying a position very close to the ground or pavement.

Further objects of my invention are to generally improve upon and simplify the construction of the existing types of motor driven omnibuses, to provide a construction that will economize space and consequently enabling a relatively large number of passengers to be carried upon a vehicle body of limited size; and further to provide the body of the vehicle with an entrance opening located at the front of the body of the vehicle and at a point adjacent to the vehicle driver's seat, thereby enabling a single operator to perform the functions of driver and conductor, to arrange an exit opening at the rear of the vehicle thereby enabling passengers to move to the rear of the vehicle and alight from the rear end thereof without being obliged to pass passengers entering the vehicle from the forward end; and further to equip the body of the vehicle with a stairway that is located immediately adjacent to the entrance and exit opening so as to permit passengers to readily ascend to the upper deck of the vehicle and to descend therefrom.

A further object of my invention is to construct an improved type of passenger carrying vehicle or omnibus, and to associate therewith a trailer, the construction of which is very similar to that of the propelling vehicle, and to arrange between the two vehicles a vestibule that is constructed so as to afford protection to the passengers moving from one vehicle to the other.

With the foregoing and other objects in view, my invention consists in certain novel features of construction and arrangement of parts that will be hereinafter more fully described and claimed and illustrated in the accompanying drawings, in which:

Figure 1 is a side elevational view of a motor driven omnibus of my improved construction.

Fig. 2 is a top plan view of the omnibus.

Fig. 3 is a rear elevational view of the omnibus.

Fig. 4 is a cross section taken on the line 4—4 of Fig. 1.

Fig. 5 is a horizontal section taken approximately on the line 5—5 of Fig. 1.

Fig. 6 is a side elevational view of a motor vehicle of my improved construction and which includes a motor driven vehicle and a trailer.

Fig. 7 is a plan view of the form of omnibus illustrated in Fig. 6, and with portions thereof broken away in order to more clearly illustrate the structure of certain parts of the vehicle.

Referring by numerals to the accompanying drawings which illustrate a practical embodiment of my invention, 10 designates the elongated body of the vehicle, and which body may be formed of wood, metal or any suitable material and including side walls 11, a bottom 12, a rear end wall 13, and a front end wall 14.

Projecting forwardly from the front portion of the body 10 is a hood 15 that incloses the engine that provides motive power for the vehicle, and arranged in the usual manner beneath the forward portion of said hood is a front axle 16 that carries the front wheels 17. The rear wheels 18 are mounted upon an axle 19 of ordinary form, which latter is disposed beneath the rear portion of the body 10, and said rear wheels 18 occupy pockets or recesses 20 that are formed in the side walls 11. Surmounting the side walls 11 is a series of elongated rectangular windows 21, and formed at the forward end of the right hand wall of the vehicle body is an entrance opening 22 that is normally closed by a pair of outwardly opening doors 23. If desired a step, such as 24, may extend downwardly from the bottom 12 of the vehicle body below the door opening 22.

Located on the left hand side of the floor 12 of the vehicle and immediately adjacent to the front wall 14 is a driver's seat 25, and positioned immediately in front thereof is the vehicle steering wheel 26 and the various control levers extending inwardly from the side walls 11 of the car body, and spaced apart by a medially arranged isle 27 is a series of transversely disposed seats 28, and those seats 28ª that extend inwardly from the portions of the side walls that are provided with the pockets 20 are necessarily shorter than the other seats. The isle 27 extends throughout the length of the vehicle body from the space between the entrance opening 22 and the driver's seat 25 and a rear or exit opening 29 that is formed in the rear wall 13 and which is normally closed by a pair of outwardly swinging self-closing doors 30, thereby affording exit but not entrance for the passengers.

From the longitudinally disposed rails 31 that are positioned immediately above the windows 21, the upper portions of the side walls of the car body extend upwardly a short distance, thence inwardly in compound curved lines that occupy a substantially horizontal plane, and thence upwardly thereby forming a pair of longitudinally disposed seats 32 that extend the entire length of the car body, and which are arranged back to back on opposite sides of the transverse center of said body. The upper inner portions of these seats are connected by a horizontally disposed top member 33, and arranged thereupon adjacent to its edges is a relatively low railing or wall 34 that serves to retain packages and the like that may be temporarily stored on the top member 33 by the passengers that occupy the seats 32.

By virtue of the construction just described, the back portions of the seats 32 are spaced a substantial distance apart so as to provide ample head room for the occupants of the space within the body of the vehicle, and particularly while said occupants are traversing the aisle between the side seats 28. Such construction eliminates the necessity for lowering the central portion of the bottom of the body of the vehicle to form a lowered aisle between the side portions 28, and at the same time the spacing apart of the backs of the seats 32 provides space for packages and bundles upon the horizontally disposed top member 33 that connects the upper portions of the seat backs.

Projecting outwardly from the posts between the windows 21 are brackets 35 that support horizontally disposed longitudinally extending foot boards 36 that project outwardly from the rails 31, and extending upwardly from the outer edges of these foot boards are rails 37 in which are arranged suitable sections of netting 38. Thus a pair of longitudinally disposed seats are provided on top of the omnibus, and which seats will accommodate a number of passengers thereby materially increasing the carrying capacity of the vehicle.

Formed through the front wall 14 of the vehicle body adjacent to the entrance opening 22 is a door opening 39, and leading therefrom upwardly to a platform 40 that is formed on the upper portion of the body in the same horizontal plane with the foot boards 36 is a stairway 41, on the outer side of which is arranged a railing 42, and which arrangement provides means for passengers to ascend to the upper deck of the vehicle and to descend therefrom. The stairway 41 is located to the side of the vehicle driver's seat 25, and therefore does not obstruct the view of the driver while operating the car or omnibus.

In the construction illustrated in Figs. 6 and 7, a trailer 43 having a body which is substantially the same in structure as the body of the motor driven vehicle, is mounted upon a wheel carrying axle 44, and the forward end of this trailer is coupled to the rear end of the motor driven vehicle in any suitable manner. The spaces between the sides of the coupled bodies are normally closed by pairs of relatively narrow doors 45, and arranged between the lower portions of the frames of said bodies are outwardly curved buffer springs 46, the central portions of which normally bear against each other and consequently absorbing any shocks and vibrations which might otherwise be transmitted from one body to the other while the vehicle is in motion. The space between the floors of the vehicle bodies, in this construction, is bridged by a relatively narrow section 47 of flexible material, such as closely woven wire netting or a heavy fabric mat.

Among the particularly desirable features of my improved omnibus and to which I desire to call especial attention are the construction of the upper portion of the body of the vehicle, and particularly the spacing of the backs of the seats on the top of the car to form head room for the passengers that occupy the seats within the body of the vehicle and eliminating the necessity for dropping the bottom of the vehicle to an abnormally low plane, the relatively low compact structure of the double decked vehicle body, the arrangement whereby a relatively large number of passengers may be conveniently and comfortably accommodated, the arrangement whereby the passengers enter the front end of the vehicle and depart from the rear end, the arrangement whereby a single operator may perform the functions of car driver and conductor, and the general construction of the vehicle body whereby the center of gravity thereof occupies a relatively low plane, and which permits the passengers to readily enter and leave the omnibus as well as adding materially to the riding qualities of the vehicle.

and as well as to the safety and stability thereof.

It will be understood that minor changes in size, form and construction of the various parts of my improved double deck omnibus may be made and substituted for those herein shown and described without departing from the spirit of my invention, the scope of which is set forth in the appended claims.

I claim as my invention:

1. A passenger vehicle comprising a body including vertical sides curved at their upper ends inwardly and downwardly toward each other to provide seats on opposite sides of the body, and then upwardly to form seat backs, a roof spanning the space between the seat backs, and foot platforms extending laterally from the vertical sides below their upper ends.

2. A passenger vehicle comprising a body including vertical sides, a roof above and between the sides, seats at opposite sides of the body formed between the roof and vertical sides and in substantially the same plane as the upper ends of the vertical sides, and foot platforms extending laterally from the vertical sides below their upper ends.

In testimony whereof I have signed my name to this specification.

EDWARD R. BRAINERD.